SUPERREGENERATIVE RECEIVER WITH AUTOMATIC SQUELCH

Filed July 30, 1963

INVENTOR.
RAYMOND P. MURRAY
BY
Paul M. Klein Jr.
ATTORNEY

United States Patent Office 3,296,535

Patented Jan. 3, 1967

3,296,535
SUPERREGENERATIVE RECEIVER WITH AUTOMATIC SQUELCH

Raymond P. Murray, 28 Sierra Vista Drive, Monterey, Calif. 93940

Filed July 30, 1963, Ser. No. 298,804
7 Claims. (Cl. 325—429)

Figures 1, 2:
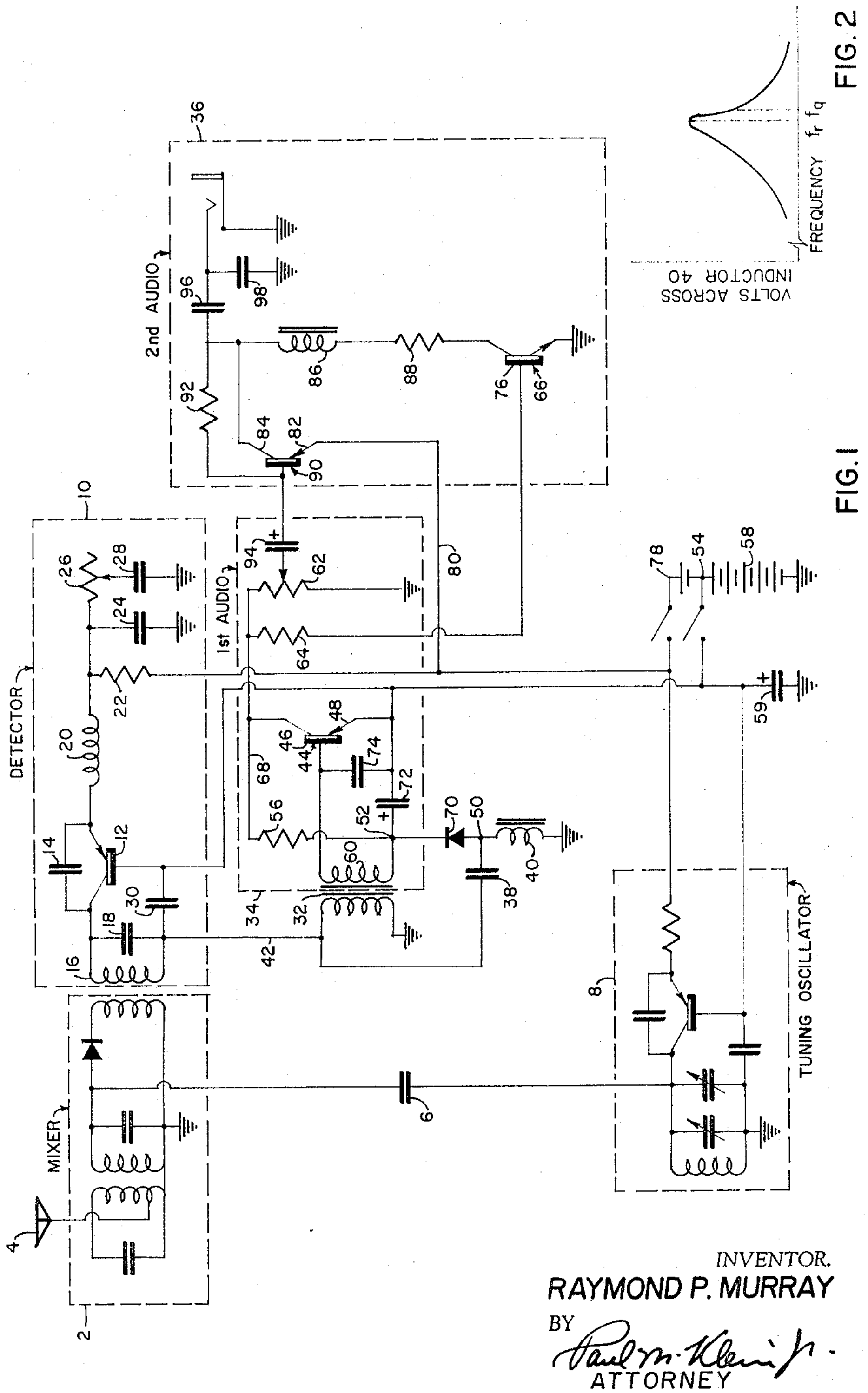

The invention described herein may be manufactured and used by or for the Government of the United States of America for governmental purposes without the payment of any royalties thereon or therefor.

This invention relates to a superregenerative receiver with automatic squelch.

This invention is an improvement on the invention embodied in patent application Serial No. 192,290, filed May 3, 1962, now Patent Number 3,199,031, jointly in the names of Jack R. Harris and the present inventor.

An object of the present invention is to provide an improved superregenerative receiver with automatic squelch which has fewer components and yet better performance than prior art receivers.

Another object of the invention is to provide techniques for saving power by automatically turning off power-consuming circuits when they are not needed in equipment.

Other objects, advantages and novel features of the invention will become apparent from the following detailed description when considered in connection with the accompanying drawings wherein:

FIG. 1 is a schematic view of a preferred embodiment of this invention in the form of a transistor type radio receiver using a self-quenched superregenerative detector embodying the squelch circuit of this invention and certain power-saving techniques; and FIG. 2 is a portion of the resonance curve of the quench voltage amplifier of this invention showing the relation between the resonant frequency and the quench frequency.

The circuit of the illustrated embodiment is somewhat similar to that shown in the aforementioned related application but eliminates some half dozen components from the circuit of that application and yet produces an equipment which performs better than that of the related application. It has less current consumption, fewer feedback problems, and fewer temperature stability problems.

As used in this application the term "active element" means a controlled source of energy dependent on a control signal for the generation of voltage or current. It is exemplified by electron tubes and transistors. In any event an active element will include a collector-emitter circuit which is controllable by a control electrode. A "passive element," as used herein, is a component not constituting a source of energy at all. It is exemplified by resistors, capacitors, and inductors.

A detailed description of the illustrated circuit will first be given. It is followed by a formulation of certain of the inventive concepts in this application making use of retrospective reference to the detailed description and the drawings.

Reference is now made to the drawings.

Circuit 2 is a mixer which may receive a signal from an antenna 4, and also a signal, coupled by means such as capacitor 6, which may be a gimmick, from the local oscillator 8, and by means of conventional superheterodyne action, translate the incoming signal to an intermediate frequency. This intermediate frequency can be considered as the desired incoming signal to the superregenerative detector circuit 10.

In the detector circuit 10, the feedback between collector and emitter of transistor 12 is by means of capacitor 14 which may in whole or in part be supplied by the transistor internal capacitance and wiring capacitance. Radio frequency oscillations occur at a frequency dependent primarily upon the tuned circuit comprised of inductor 16 and capacitor 18 which are resonant at a frequency corresponding to the frequency of the signal from the mixer. It should be noted that this invention is equally applicable to receivers in which the incoming signal is applied directly to the superregenerative detector from the antenna. The incoming signal, whether direct from the antenna or from the mixer, can be regarded as a radio frequency oscillation.

Inductor 20 is a radio frequency choke which keeps the emitter of transistor 12 above ground potential. Resistor 22 and capacitor 24 comprise an RC time constant circuit which causes the radio frequency oscillations to be interrupted at the quench frequency which is very much less than the frequency of the radio frequency oscillations but considerably above the modulation frequency of the incoming signal. Variable resistor 26 and capacitor 28 provide a means of adjusting the quench frequency and, as will be shown, allow resistor 26 to be used as the squelch control which will determine the strength of the incoming signal required to operate the squelch.

Capacitor 30 acts as a radio frequency bypass capacitor and thus returns the cold end of the tuned circuit comprised of capacitor 18 and inductor 16 to the base of transistor 12. The output signal of the detector is passed through the primary of iron-core coupling transformer 32. This signal may be composed of a modulation signal from the incoming wave, a quench frequency component, a noise component, and a hiss component generated by the superregenerative detector. This signal is passed through audio amplifier 34 and output audio amplifier 36.

Now to be considered is the development of the control signal and its action to provide automatic squelch. It will first be assumed that no incoming signal is present. The output signal of the superregenerative detector is fed to a combined frequency discriminator and quench voltage amplifier comprised of capacitor 38 and inductor 40. The resonant frequency $f_r$, of this circuit is slightly lower than the quench frequency $f_q$, as shown in FIG. 2. $f_r$ is chosen so that the quench frequency appears on the steep section of the resonance curve. Although the illustrated embodiment is thus seen to use the fundamental component of the quench voltage, it is also possible to use a harmonic of the quench voltage. Thus, when the term "quench voltage" or the like is used in reference to this invention it should be understood to mean generally either the fundamental or a harmonic. Further, it is possible to operate the quench frequency on the other side of the resonance curve to obtain a control voltage which shifts oppositely.

The audio signal at point 42 passes through the transformer 32 which transfers the signal from point 42 over to the transistor 44, matching impedances. Along with applying the signal between the base 46 of transistor 44 and its emitter 48, the quench frequency voltage at 42 is fed through the series C–L circuit 38, 40, and operates this circuit near resonance. The voltage across inductor 40 will be larger than the voltage at 42, and, in the absence of signal, will be considerably larger than in the presence of signal.

In the presence of signal the quench frequency voltage at the point 50 is set by the adjustable resistor 26 to be less than the voltage at point 52, which latter points is nearly the same as the voltage at emitter 48. The voltage at point 54 may be about 7 volts in a typical instance and if the emitter-base circuit of the forwardly biased transistor 44 has a voltage drop of .15 volt the voltage at point 52 would be 6.85 volts. The .15 voltage drop is typical for a germanium transistor. Other transistors would differ. The forward bias of this junction is provided by resistor 56 and battery 58 and means that this junction presents a low impedance. It may be noted that battery 58 is bypassed by a decoupling capacitor 59. For the PNP type of transistor illustrated, forward bias requires applying to the base a more negative voltage than is applied to the emitter. The path for applying the potential from the battery 58 to the base 46 of the transistor 44 for forward bias is as follows: starting at point 54, thence to emitter 48, through the emitter-base junction, through the D.C. conductive path in secondary winding 60, to point 52, thence through the resistor 56, and through the collector load resistor 62 and, parallel with 62, through the collector load resistor 64 and the latter's associated transistor 66 back to ground, which is the negative end of battery 58. Typically the voltages will be as follows: at point 48, 7 volts; at the base 46 of transistor 44, and hence at point 52, 6.85 volts; at the conductor 68, +3 volts. During the presence of signal the A.C. positive peak voltage at point 50 never rises as high as the voltage at point 52, i.e. 6.85 volts, and therefore the diode 70, which is interposed between these two points, is reverse-biased and non-conducting.

A capacitor 72 is in series with the secondary 60 of transformer 32 and the emitter-base circuit of transistor 44. This capacitor provides a low impedance path from the bottom (cold side) of secondary winding 60 to the emitter 48 of transistor 44. It also acts as a smoothing filter capacitor for the rectifier 70 which, as will shortly become apparent, becomes conductive and rectifies in the absence of signal.

Bypass capacitor 74 bypasses the quench frequency and hence prevents it from feeding onto the base 46 of transistor 44 which would be overdriven thereby, causing distortion and loss of gain in this first audio stage.

In the absence of signal the quench frequency shifts such that the quench frequency voltage across inductor 40 rises. In the normal operation of this circuit this voltage rises so that its positive peak value exceeds the voltage that was at 52 during the presence of signal. Thus diode 70 is now conducting and causes the voltage at point 52 to increase from a former value of 6.85 volts with respect to ground to approximately +9 volts with respect to ground. This plus voltage at point 52 is applied through 60 to the base of transistor 44 thereby turning off transistor 44 since the base has thus become positive relative to the emitter voltage at 48 which is still 7 volts.

Recalling that in the presence of signal the capacitor 72 had on its left-hand plate a voltage of 6.85 and on its right-hand plate a voltage of 7, both being positive with respect to ground, note that now, in the absence of signal the left-hand plate carries a voltage of +9 with respect to ground and the right-hand plate still a voltage of +7 with respect to ground. Now, with transistor 44 cut off so that no current can flow through its collector electrode, the only possible flow through diode 70 is through resistor 56, conductor 68, and resistors 62 and 64 to ground. The magnitude of this current flow, because of the size of resistance of 56, will be negligible. Note that this very small current drain through the resistor 56 and resistors 62 and 64 is supplied from the quench signal voltage developed across inductor 40 and not directly from the battery 58, although ultimately the battery 58 is the source for the power involved inasmuch as it supplies the second detector stage where the quench frequency signal originates.

In the absence of signal, the volt drop between point 52 (which is at +9 volts relative to ground) and ground is split between resistor 56 (390K) and the collector load resistors 62 and 64. The parallel combination of 62 and 64 gives a total resistance of about, typically, 1600 ohms and therefore the voltage drop between conductor 68 and ground is nearly zero and thus the transistor 66 is cut off since the potential at its base 76 is essentially zero. When the transistor 66 is thus cut off no current flows in the circuit 78, 80, 82, 84, 86, 88, 66, ground. This represents a saving of about 8 milliamps which do normally flow in that path.

When in the presence of signal, as previously described, the voltage at point 68 is approximately 3 volts. This voltage forces a current through resistor 64 into the base 76 of transistor 66 turning it on thereby allowing the normal collector current of transistor 90 to flow.

In general, the power consumed in a transistor is very small when the transistor is saturated or cut off but not when it is in the normal active region. The transistor 66, for example, when conducting in the presence of signal is operating saturated and exhibits a collector-emitter current of about 8 milliamps and a collector-emitter volt drop of about .05 volt while at the same time it exhibits a base-emitter current of about 1 milliamp and a base-emitter volt drop of .15 of a volt. Note that transistor 66 is an NPN transistor which means that a positive signal applied to the base with respect to the emitter is a turn-on signal.

Note that in the turn off process which involves positive squelching and battery saving, the presence of a high positive voltage at 50 causes a flow of current through diode 70 charging up capacitor 72 so that its left-hand plate goes relatively highly positive, rendering the base 46 of transistor 44 positive relative to its emitter 48 and therefore cutting off the conduction from emitter to collector of transistor 44. This same making of base 46 positive relative to emitter 48 causes the base 76 of transistor 66 to become nearly zero, this being accomplished in the following way. The potential at point 68 at a time when the transistor 44 is conducting is principally controlled by, say, the application of Kirchoff's law through the following path: 54, emitter 48 of transistor 44 which always, when it conducts, operates in the active region as an ordinary amplifier (i.e. not saturated nor cut off) and thence through conductor 68, resistor 62, and resistor 64 and transistor 66, to ground which is the other end of the battery. It is the bias between emitter 48 and base 46 which determines the operating point of the transistor. As previously noted, the point 52, which is the same D.C.-wise as base 46, assumes a voltage of 6.85. This voltage is determined thus: with the transistor in conducting condition, current flows from the emitter 48 to the base; the volt drop sequence along this path is from a fixed voltage of +7 at emitter 48 across the emitter-base junction a volt drop of .15 volt, thence through the 390K resistor 56, thence through the parallel arrangement of resistors 62 and 64 to ground which is the other end of battery 58. Under these circumstances a current of about 10 microamperes flows in the emitter-base circuit. The potential assumed by the base 46 under these self-biasing conditions is seen to be the voltage at 48 (+7) less the volt drop across 48 to 46 (.15 volt) which yields 6.85 volts.

In general, transistors will cut off if the difference between base and emitter voltage is zero or close to zero in either direction, i.e. with the base slightly positive or slightly negative relative to the emitter.

A voltage change of 2.15 at point 52 from +9 volts down to 6.85 volts in a high impedance circuit changes the voltage at the collector of transistor 44 from zero volts to +3 volts, thereby providing ample signal to turn on transistor 66. In turning off transistor 66 there is involved a reduction of 3 volts, i.e. from +3 volts down to about zero at point 68 through a low impedance circuit.

The several components associated with the second audio stage serve the following purposes. The choke 86 is a part of the choke-coupled output and serves to maintain the collector voltage more nearly at battery voltage than with resistance coupling. Some resistance is, however, needed in the collector circuit for temperature stability. This is provided by resistor 88. 92 is a bias resistor to determine the operating point of transistor 90. 94 is a blocking capacitor for blocking D.C. and transmitting audio voltage. The same is true of capacitor 96. Capacitor 98 bypasses to ground any undesired quench frequency voltage which may have leaked through the preceding stages and also serves to reduce distortion when used with an inductive load, e.g. head phones.

A formulation of certain specific inventive concepts embodied within the scope of this invention will now be undertaken.

Several methods can be used to prevent transmission of signal through a stage of a network. One method is to open-circuit a path through which incoming signal is fed to the stage. Another method is to open-circuit, actually and/or effectively, an element in the stage itself through which the signal must pass if it is to travel through the stage. A third method is to effectively short-circuit an element that is in shunt with the signal path. A fourth method is to open-circuit a path through which the output signal of the stage travels.

Certain inventive features are illustrated in the use, in the pictured embodiment of the invention, of active elements as open-circuiting devices not only for the purpose of preventing transmission of signal through a network but also for the purpose of saving power by stopping, when it is not needed, the flow of power into power-consuming networks from a power supply. When the power supply source is a battery, this means an appreciable and important extension in battery life. The power-saving features are part of an inventive concept applicable not only to the specific apparatus illustrated but to other circuits including equipments other than superregenerative receivers; that inventive concept is, therefore, appropriately embraceable in other patent applications bearing the name of the present inventor. Whereas various signals can be used according to that inventive concept to accomplish power saving and those signals may also simultaneously accomplish other purposes, such as the blocking of the transmission of undesired noise, in the illustrated circuit it is the rectified quench signal which is used, both directly and in amplified form, to accomplish power saving and the turn-off of audio signal.

The application of the rectified quench signal voltage, either per se or amplified, to an electrode of an active element to interrupt or cut off the flow of signal through a stage of a network can be accomplished in several ways. One way, illustrated with reference to a transistor as exemplary of the active element, is to saturate the transistor. This effectively prevents transmission of signal through it and thus effectively short-circuits the transistor insofar as signal is concerned. However, this does not open-circuit the main power-consuming path through the transistor, i.e. the emitter-collector circuit, and indeed it causes a maximum flow of collector current; hence it is obviously not a power-saving technique. Another way is to, in effect, open the emitter-collector circuit of an active element. This way has the advantage of saving power inasmuch as usually it is in the emitter-collector circuit when appreciable power is consumed, this being the path of greatest current flow.

The emitter-collector circuit can be open-circuited at any convenient place and by any convenient means. In the case of transistor 44, for example, the emitter-collector circuit is opened right within the transistor itself by rendering the transistor non-conducting in response to the application of reverse bias to base 46. This novel inventive feature uses part of the transistor 44 as a switch to turn the transistor itself off, i.e. as a gated amplifier in which a part of its structure serving in one capacity as a switch is used to disable the entire structure, regarded as an amplifier in which the switch structure serves also in the capacity of part of the input signal circuit. This arrangement is adapted for use, as in the illustrated apparatus, where, as is expected in the first audio stage, the currents to be switched off are relatively small and are easy to turn off with a relatively small change of bias voltage on the base of the transistor. This arrangement obviates the need for a separate switching device to be inserted in the apparatus solely for cutting off the flow of signal through the first audio stage. This arrangement also is obviously a power-saving technique since it cuts off the flow of collector current at a time when it is not needed.

A different manner of opening a collector-emitter circuit is illustrated in the case of transistor 90. Here the opening is accomplished in the part of the circuit external to the active element 90 by means of the switching transistor 66. The opening by switch 66 of the collector-emitter circuit of active element 90 is seen to actually and effectively open-circuit the output circuit of the second audio stage and thus prevent transmission through and/or out of this stage of any audio signal fed into it. Of course, in the illustrated circuit, this function is unnecessary and redundant insofar as blocking noise to the final output is concerned, inasmuch as the first audio stage has already been shown to be disabled at each time that the second audio stage is open-circuited. However, the inventive principle is applicable generally and independently in locations where this function would not be superfluous.

The opening of switch 66 is additionally and importantly seen to open a major power-consuming circuit of the stage, i.e. the collector-emitter circuit of active element 90. Were a switch such as 66 located, for example, in one of the leads to capacitor 96 it would as well serve to prevent transmission of signal in the second audio stage to the final otuput transducer but it would not serve to economize on power drain since there it would have no effect on the bias currents drawn by transistor 90. It is of interest to note that, according to the inventive arrangement, the switch 66, during the time it performs the function of keeping open the output branch of the second audio stage, consumes no power itself either in its control element circuit or in its main current stream circuit, i.e. its own collector-emitter path.

Since the collector-emitter circuit of transistor 90 is in the second audio stage, it carries a rather high current. To render switch transistor 66 sufficiently conductive (i.e. saturated) to pass such a high current without opposition requires the maintenance of a relatively high emitter-base bias current through 66 which in turn requires a relatively high (e.g. 3 volts) bias supply voltage. To turn off the conduction through 66 consequently requires a reduction of this bias supply voltage down to essentially zero. This relatively widely-swinging bias voltage is furnished, according to the invention, by using the transistor 44 as a D.C. amplifier to amplify a change in D.C. voltage in a high impedance circuit at the top of diode 70 and this, remarkably, at the very moment when the transistor 44 is itself being turned off. Thus 44, according to the invention, is used as an amplifier at no expense of power consumption to furnish the relatively large voltage change needed to turn off switch 66.

An extension of the aforedescribed amplification of a turn-on-turn-off signal to other additional circuits is obviously within the scope of the invention. The substitution of electron tubes, other types of transistors, and other active elements than those illustrated is also within the scope of the invention.

Obviously many other modifications and variations of the present invention are possible in the light of the above teachings. It is therefore to be understood that within the scope of the appended claims the invention may be practiced otherwise than as specifically described.

What is claimed is:

1. A radio receiving system comprising a supperregenerative detector adapted to receive an external signal and generate output audio and quench frequency signals;

an audio stage, said audio stage including an active element for first amplifying the audio signal and which element has a control electrode for controlling flow of signal through said active element;

a series-connected capacitor and inductor serving as a combined frequency discriminator and quench voltage amplifier connected to receive the output quench signal of said superregenerative detector, the series-connected capacitor and inductor having a resonant frequency which is different from the frequency of the quench signal;

means for rectifying and smoothing the amplified quench signal from the series-connected capacitor and inductor; and means for applying the rectified, smoothed quench signal from the rectifying and smoothing means to said control electrode to turn on and off the flow of audio signal through said audio stage in response to shift in quench frequency occasioned by the presence and absence of said external signal.

2. The system of claim 1 further comprising a second audio stage including an output branch, means for effectively opening a circuit in the output branch of said second audio stage in response to the turning off of the flow of audio signal through said first audio stage.

3. A radio receiving system comprising:

a superregenerative detector adapted to receive an external signal and generate output audio and quench frequency signals;

an audio stage, said audio stage including an active element for amplifying the audio signal and which element has a control electrode for controlling flow of signal through said active element;

a series-connected capacitor and inductor serving as a combined frequency discriminator and quench voltage amplifier connected to receive the output quench signal of said superregenerative detector, the series-connected capacitor and inductor having a resonant frequency which is different from the frequency of the quench signal;

means for rectifying and smoothing the amplified quench signal from the series-connected capacitor and inductor;

means for applying the rectified, smooth quench signal from the rectifying and smoothing means to said control electrode to turn on and off the flow of audio signal through said audio stage in response to shift in quench frequency occasioned by the presence and absence of said external signal;

a second audio stage, said second audio stage including an active element for amplifying the audio signal; and means for opening the collector-emitter circuit of the second audio stage active element in response to the output of the first audio stage active element as a result of a change in the rectified quench signal applied to the control electrode of the first audio stage active element.

4. A radio receiving system comprising:

a superregenerative detector adapted to receive an external signal and generate output audio and quench frequency signals;

an audio stage, said audio stage including an active element for amplifying the audio signal and which element has a control electrode for controlling flow of signal through said active element;

a series-connected capacitor and inductor serving as a combined frequency discriminator and quench voltage amplifier connected to receive the output quench signal of said superregenerative detector, the series-connected capacitor and inductor having a resonant frequency which is different from the frequency of the quench signal;

means for rectifying and smoothing the amplified quench signal from the series-connected capacitor and inductor;

means for applying the rectified, smooth quench signal from the rectifying and smoothing means to said control electrode to turn on and off the flow of audio signal through said audio stage in response to shift in quench frequency occasioned by the presence and absence of said external signal;

a second audio stage, said second audio stage including an active element for amplifying the audio signal;

means for opening the collector-emitter circuit of the second audio stage active element in response to the output of the first audio stage active element as a result of a change in the rectified quench signal applied to the control electrode of the first audio stage active element;

a second active element interposed in the collector-emitter circuit of the first active element of the second audio stage; and means for applying the output of the first audio stage active element to a control electrode of said second active element.

5. A radio receiving system comprising:

a superregenerative detector adapted to receive an external signal and generate output audio and quench frequency signals;

an audio stage, said audio stage including an active element for amplifying the audio signal and which element has a control electrode for controlling flow of signal through said active element;

a series-connected capacitor and inductor serving as a combined frequency discriminator and quench voltage amplifier connected to receive the output quench signal of said superregenerative detector, the series-connected capacitor and inductor having a resonant frequency which is different from the frequency of the quench signal;

means for rectifying and smoothing the amplified quench signal from the series-connected capacitor and inductor;

means for applying the rectified, smooth quench signal from the rectifying and smoothing means to said control electrode to turn on and off the flow of audio signal through said audio stage in response to shift in quench frequency occasioned by the presence and absence of said external signal;

the active element being a transistor;

an audio transformer having a secondary winding which has its high voltage side, with respect to ground, connected directly to the base of said transistor and its low voltage side, with respect to ground, connected through a capacitor to the emitter of said transistor;

means for connecting to the low voltage side of said secondary the output of the means for rectifying the amplified quench signal; and a feedback resistor connected between the collector of said transistor and the low voltage side of said secondary.

6. The system of claim 5 further comprising:

a second audio stage coupled through only passive elements to a collector of the first stage transistor;

said second audio stage including:

a first transistor for amplifying the audio signal, a second transistor interposed as a switch in the emitter-collector circuit of said first transistor; and means to connect a control element of said second transistor of the second audio stage to a collector of the first audio stage transistor whereby a change in the potential of the collector of the first audio stage transistor serves to open-circuit the second transistor of the second audio stage.

7. The system of claim 6 further including:

a blocking capacitor to extract the output of said second audio stage;

one terminal of said blocking capacitor being connected to the collector of the first transistor of the second audio stage; and the other terminal of said blocking capacitor being connected to a bypass capacitor for bypassing quench frequency.

References Cited by the Examiner

UNITED STATES PATENTS 3,199,031 8/1965 Harris et al. ---------- 325—429

KATHLEEN H. CLAFFY, *Primary Examiner.*

R. LINN, *Assistant Examiner.*